(12) United States Patent
Kiwaki

(10) Patent No.: US 8,534,334 B2
(45) Date of Patent: Sep. 17, 2013

(54) TIRE HAVING AIR CHAMBER AND CONSTRICTION GROOVE IN RIB SHAPED LAND PORTION

(75) Inventor: Yukihiro Kiwaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 8 days.

(21) Appl. No.: 13/321,787

(22) PCT Filed: Nov. 24, 2009

(86) PCT No.: PCT/JP2009/006324
§ 371 (c)(1),
(2), (4) Date: Feb. 6, 2012

(87) PCT Pub. No.: WO2010/134144
PCT Pub. Date: Nov. 25, 2010

(65) Prior Publication Data
US 2012/0125500 A1 May 24, 2012

(30) Foreign Application Priority Data
May 22, 2009 (JP) .................................. 2009-124615

(51) Int. Cl.
*B60C 11/12* (2006.01)
*B60C 11/13* (2006.01)

(52) U.S. Cl.
USPC ............ 152/209.15; 152/209.18; 152/209.21; 152/DIG. 3

(58) Field of Classification Search
USPC .............. 152/209.15, 209.18, 209.21, DIG. 3
See application file for complete search history.

(56) References Cited

U.S. PATENT DOCUMENTS 5,714,021 A * 2/1998 Ochi .................... 152/209.15
7,322,391 B2 * 1/2008 Metz .................... 152/209.21
(Continued)

FOREIGN PATENT DOCUMENTS

JP 2005-161921 A 6/2005
JP 2007-237816 A 9/2007
(Continued)

OTHER PUBLICATIONS

International Search Report, PCT/JP2009/006324, dated Jan. 19, 2010.

*Primary Examiner* — Steven D Maki
(74) *Attorney, Agent, or Firm* — Sughrue Mion, PLLC

(57) ABSTRACT

A pneumatic tire (10) is provided with air chambers which have recessed portions (221), and also with constriction grooves which communicate with the air chambers and a circumferential groove (21), and the air chambers and the constriction grooves are formed in a rib-shaped land portion of the tire. The depth (DP1) of a recessed portion (221) measured from a land portion (211) making contact with the road surface is deeper at one end of the air chamber in the tire circumference direction than the other end of the air chamber. The height of the recessed portion (221) from the bottom surface (222) thereof to the ground contact surface varies in the circumferential direction of the tire. The volume of the space formed by a constriction groove and the road surface is less than the volume of the space of the air chamber formed by the recessed portion (221) and the road surface. The air chamber has a tapered shape in which the width of the air chamber in the tread width direction is reduced from the other end of the air chamber toward said end of the air chamber.

6 Claims, 14 Drawing Sheets

(56) References Cited

U.S. PATENT DOCUMENTS

| | | | |
|---|---|---|---|
| 2005/0076985 A1* | 4/2005 | Colombo et al. | 152/209.18 |
| 2009/0165908 A1 | 7/2009 | Takahashi et al. | |
| 2009/0272474 A1* | 11/2009 | Nagai et al. | 152/209.18 |
| 2010/0175799 A1* | 7/2010 | Takahashi et al. | 152/209.3 |

FOREIGN PATENT DOCUMENTS

| | | |
|---|---|---|
| JP | 2008-155798 A | 7/2008 |
| JP | 2008-179289 A | 8/2008 |
| WO | WO-2007/072824 A1 * | 6/2007 |
| WO | WO 2007/114430 A1 | 10/2007 |
| WO | WO 2008/102780 A1 * | 8/2008 |

* cited by examiner

FIG. 13
(a)
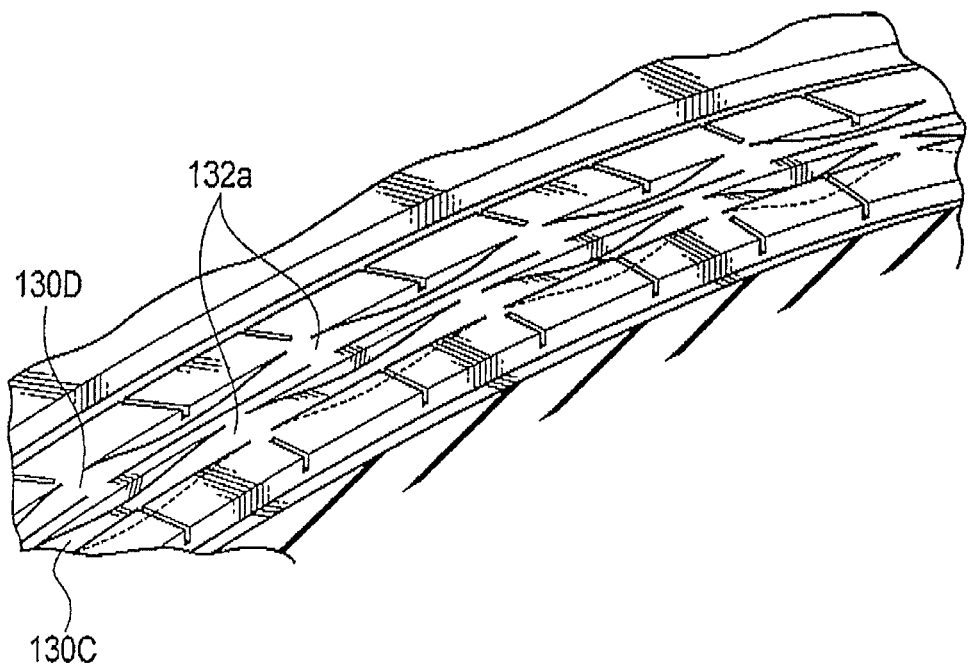
(b)
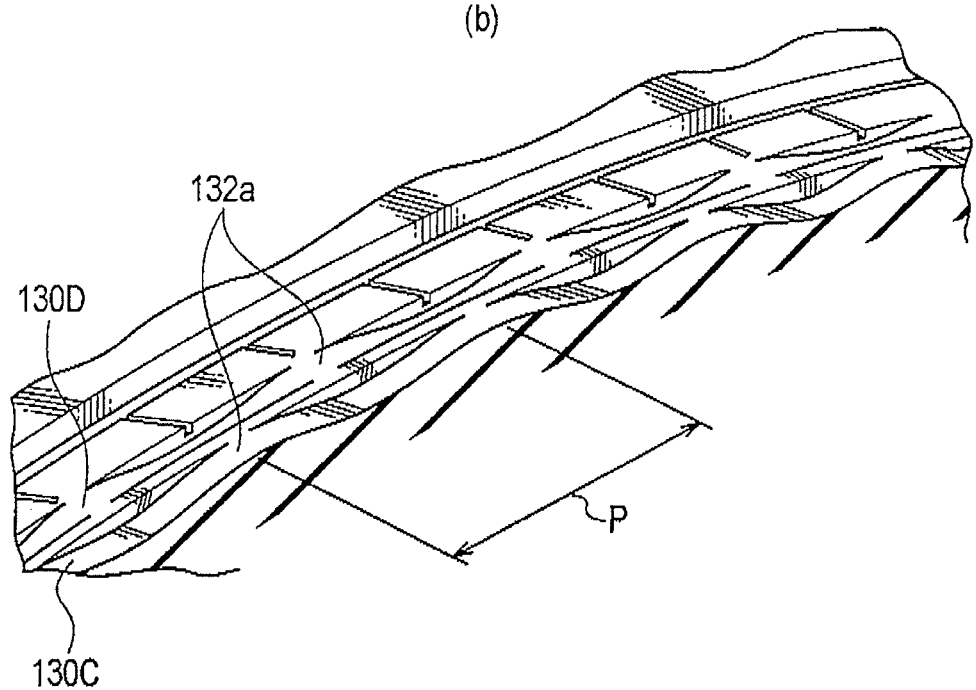

FIG. 14
(a)
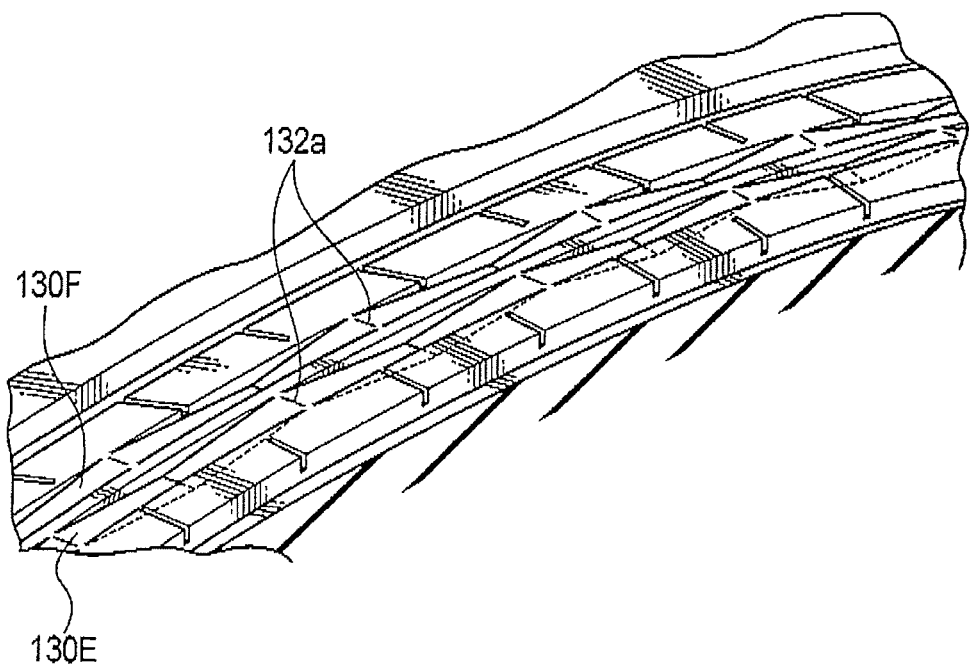
(b)
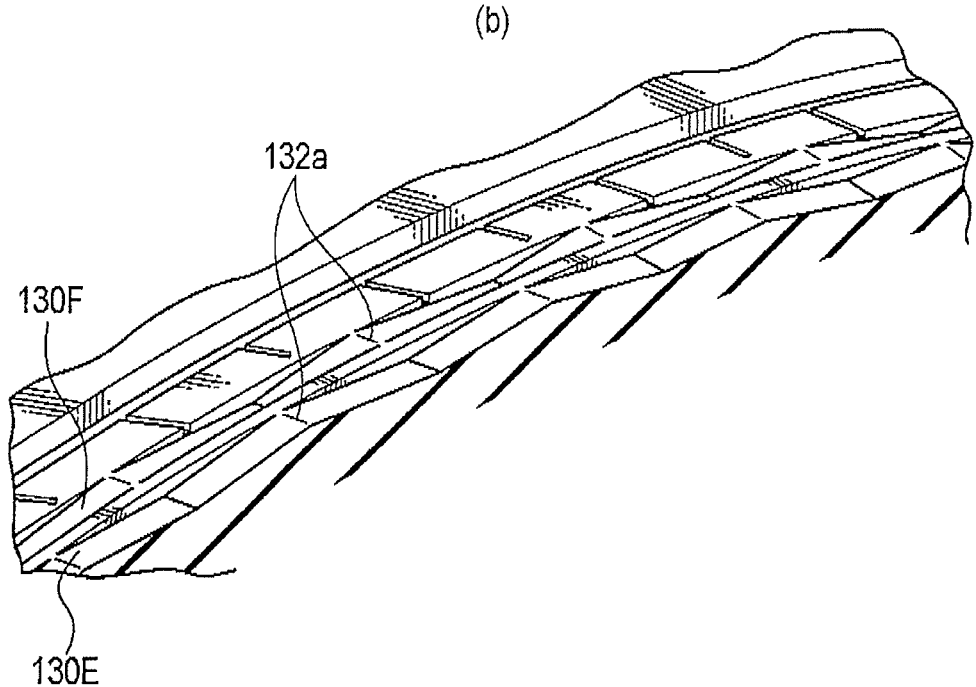

FIG. 15
(a)
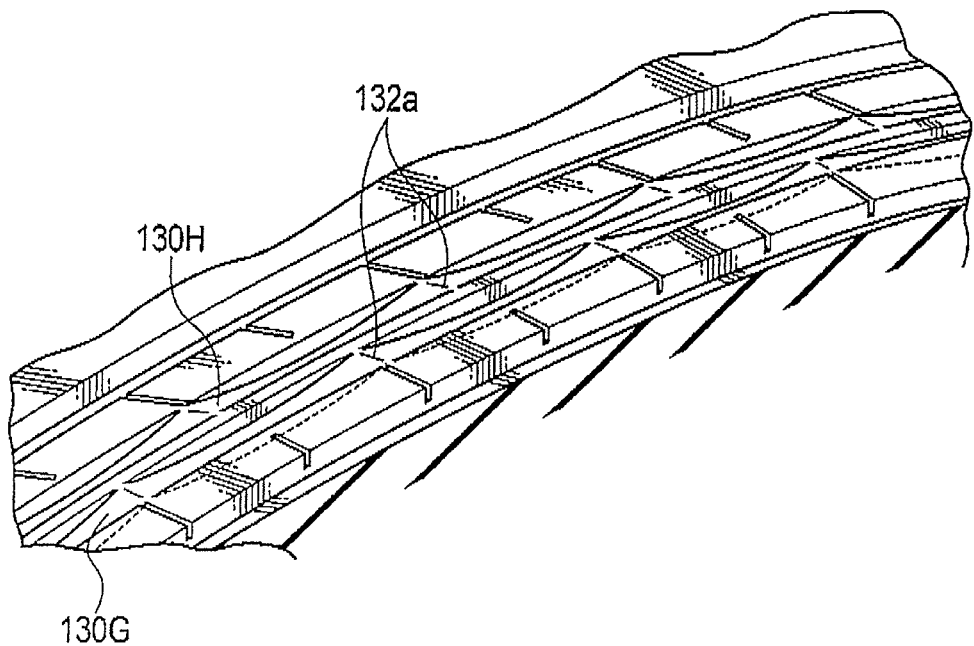
(b)
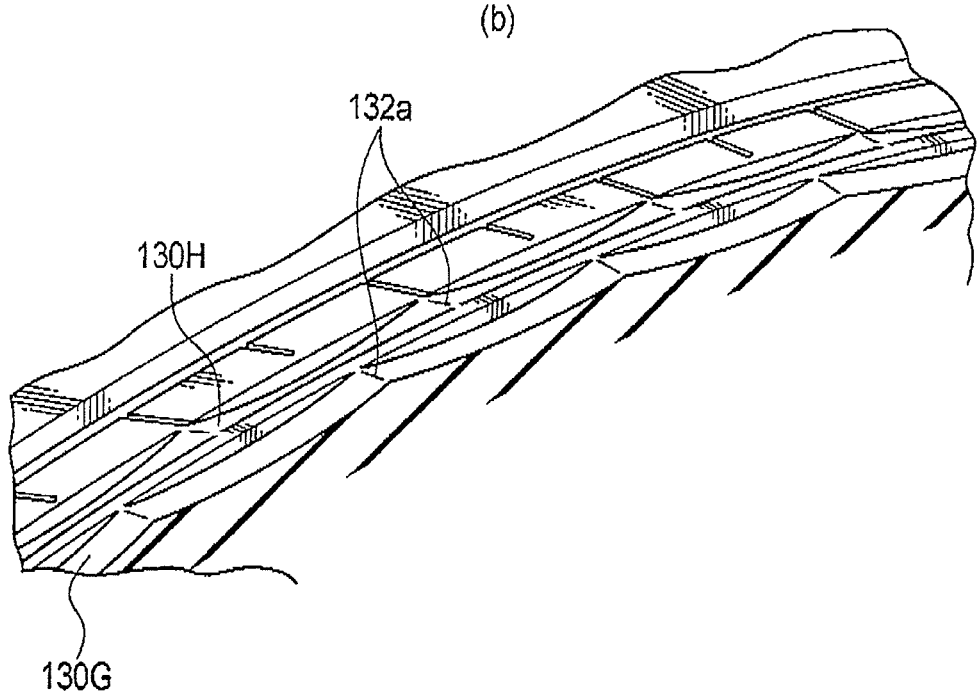

TIRE HAVING AIR CHAMBER AND CONSTRICTION GROOVE IN RIB SHAPED LAND PORTION

CROSS REFERENCE TO RELATED APPLICATIONS

This application is a National Stage of International Application No. PCT/JP2009/006324 filed Nov. 24, 2009, claiming priority based on Japanese Patent Application No. 2009-124615 filed May 22, 2009, the contents of all of which are incorporated herein by reference in their entirety.

TECHNICAL FIELD

The present invention relates to a tire equipped with a rib-shaped land portion adjacent to a circumferential groove which extends along a tire circumferential direction, in particular, to a tire provided with a Helmholtz type resonator which has an air chamber and a constriction groove, on a rib-shaped land portion.

BACKGROUND ART

In passenger vehicles of recent years, the demands for the reduction of tire noise have been increasing more and more compared to the past along with the improved reduction of vehicle noise (such as wind sounds and mechanical sounds) and further consideration of the environment.

From among the different types of tire noises, in order to reduce the air column resonance resulting from a space formed by the circumferential groove extending along the tire circumferential direction and the road surface, known are tires provided with a Helmholtz type resonator on the rib-shaped land portion extending along the tire circumferential direction. These resonators have an air chamber that forms a constant space by the tread making contact with the road surface and a constriction groove that communicates to the air chamber and the circumferential groove (for example, Patent Document 1).

Prior Art Document
Patent Document
Patent Document 1: JP-A-2008-179289 (pages 4 to 5, FIG. 3)

SUMMARY OF THE INVENTION

However, the following problems exist in the conventional tires described above. That is, there easily occurs a so-called "wedged stone" incident, i.e., a small stone easily wedges itself in the Helmholtz type resonator provided on the rib-shaped land portion and especially in the air chamber, thereby becoming a cause of increases of tire noises, After all, in spite of having a tread pattern that takes the reduction of the air column resonance into consideration, there is still a problem of not being able to effectively reduce the tire noise. Of course, if the size of the air chamber is increased, the wedged stone will be reduced although another problem occurs that does not allow the air column resonance to be effectively reduced.

Thereupon, an object of the present invention is to provide a tire that inhibits the wedging of small stones and effectively reduces the air column resonance when Helmholtz type resonator is provided which has an air chamber that forms a constant space by making contact with the road surface and a constriction groove communicating to the air chamber and the circumferential groove.

To solve the above problems, the present invention has following features. First, a first feature of the present invention is summarized as a tire (pneumatic tire 10) comprising a rib-shaped land portion (rib-shaped land portion 210, for example) extending along a tire circumferential direction (direction D1), which is adjacent to a circumferential groove (circumferential groove 21, for example) extending along the tire circumferential direction, wherein an air chamber (chamber 220) having a recessed portion (recessed portion 221) recessed toward an inside in the tire radial direction and a constriction groove (constriction groove 230) communicating to the air chamber and the circumferential groove are provided on the rib-shaped land portion, a depth (depth D1) of the recessed portion where a grounding surface (land portion 211) on which the rib-shaped land portion grounds a road surface as a reference is deeper at one end (end portion 220b) of the air chamber in the tire circumferential direction than at the other end (end portion 220a) of the air chamber, a height from a bottom surface (bottom surface 222) of the recessed portion to the grounding surface changes along the tire circumferential direction, a volume of a space formed by the constriction groove and the road surface is smaller than a volume of a space formed by the recessed portion and the road surface, one end of the constriction groove communicates to a closed spaced formed by the air chamber and the road surface, and the other end of the constriction groove communicates to the circumferential groove, a depth (depth D2) of the constriction groove is deeper than a depth from the grounding surface to the recessed portion, and the constriction groove includes an extended portion (inner groove 232) extending to one end of the air chamber.

A second feature of the present invention according to the first feature is summarized as that the bottom surface of the recessed portion comprises: a curved portion (curved portion 223) having a curved line shape, in a cross-sectional view along the tire circumferential direction; and a linear portion (linear portion 224) having a linear shape, in a cross-sectional view along the tire circumferential direction, the center (CT2) of a circular arc along the curved portion is positioned closer to an inside in the tire radial direction than the bottom surface, the linear portion is formed at one end side of the air chamber, and one end (end portion 224a) of the linear portion communicates to the curved portion, and the other end (end portion 224b) of the linear portion communicates to the grounding surface.

A third feature of the present invention according to the first or second feature is summarized as that the constriction groove communicates to the other end of the air chamber in a tire circumferential direction.

A fourth feature of the present invention according to the first to third features is summarized as that the extended portion is formed between the recessed portion and the grounding surface.

A fifth feature of the present invention according to the first to fourth features is summarized as that the cross sectional area along a tread width direction and a tire radial direction of the recessed portion is approximately the same as the area from one end to the other end in the tire circumferential direction of the curved portion.

A sixth feature of the present invention according to the first to fifth features is summarized as that the rib-shaped land portion comprises: a first rib-shaped land portion (rib-shaped land portion 210) in which a plurality of the air chambers are arranged along the tire circumferential direction; and a second rib-shaped land portion (rib-shaped land portion 240) in which a plurality of the air chambers are arranged along the tire circumferential direction and which is positioned at a position different from a position at which the first rib-shaped land portion is positioned in a tread width direction, and a position, in the tire circumferential direction, of the air chamber (chamber 220) formed in the first rib-shaped land portion differs from a position of the air chamber (chamber 250) formed in the second rib-shaped land portion.

A seventh feature of the present invention according to the sixth feature is summarized as that a position (end portion 223b) where the depth from the grounding surface of the recessed portion formed in the second rib-shaped land portion is deepest is approximately the same as a position (end portion 223a) where the depth from the grounding surface of the recessed portion formed in the first rib-shaped land portion is shallowest in the tire circumferential direction.

An eighth feature of the present invention according to the first to seventh features is summarized as that the air chamber has a tapered shape in which a width (width) in the tread width direction becomes narrower in proportion to movement from the other end of the air chamber toward one end thereof as viewed in a tread plane.

According to the characteristics of the present invention, it is possible to provide a tire that inhibits the wedging of small stones and effectively reduces the air column resonance when Helmholtz type resonator is provided which has an air chamber that forms a constant space by making contact with the road surface and a constriction groove communicating to the air chamber and the circumferential groove.

BRIEF DESCRIPTION OF THE DRAWINGS

FIG. 13 shows an air chamber relating to a modification of the present invention.

FIG. 14 shows an air chamber relating to another modification of the present invention.

FIG. 15 shows an air chamber relating to yet another modification of the present invention.

DESCRIPTION OF EMBODIMENTS

Figure 1:
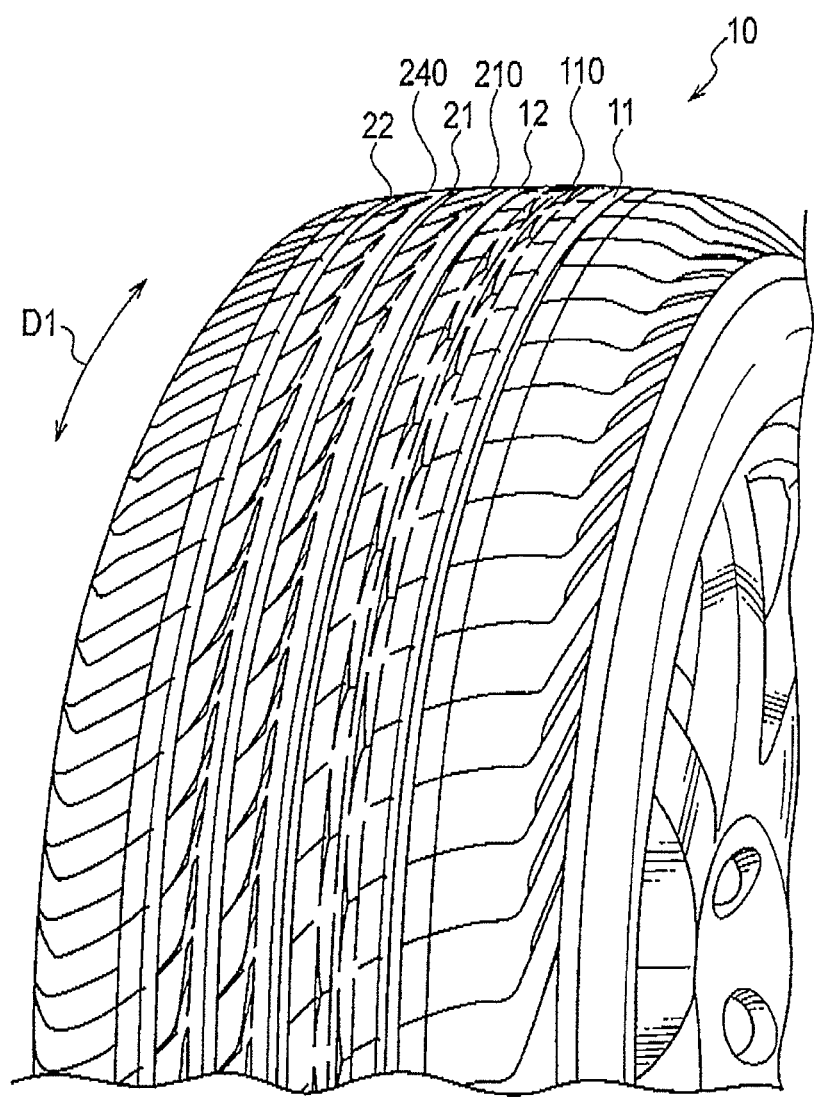
FIG. 1 is a partial perspective view of the pneumatic tire 10 according to an embodiment of the present invention.

Next, embodiments of the tire according to the present invention will be described referring to the drawings. Specifically, a first embodiment, a second embodiment, modifications, and other embodiments will be described.

In the following description of the drawings, the same or like constituent elements are designated by the same or like reference numerals. However, it should be kept in mind that the drawings are merely provided as schematic ones, and that each of the ratios of dimensions or the like is different from actual ones.

Therefore, specific dimensions or the like should be determined in consideration of the following description. In addition, it is a matter of course that, among the drawings as well, units of which interrelationships of dimensions or ratios are different from each other are included.

(1) Overall Tire Outline Composition

Figure 2:
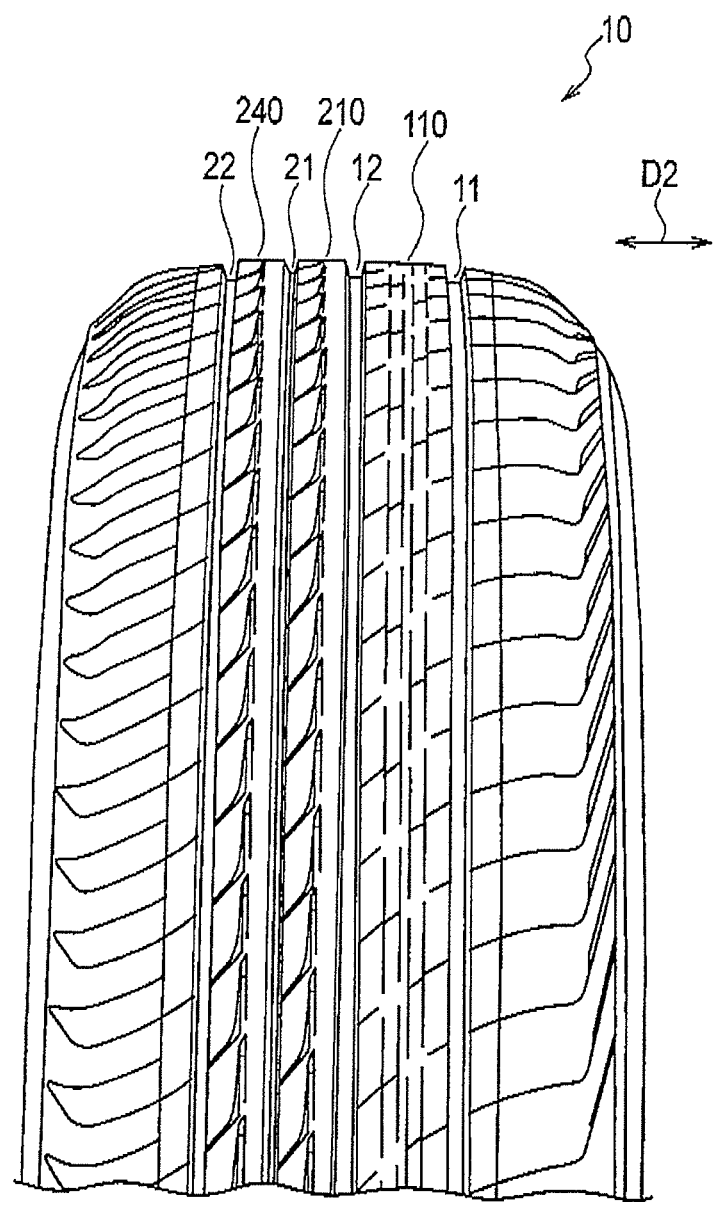
FIG. 2 is a partial front view of the pneumatic tire 10 according to the embodiment of the present invention.

FIG. 1 is a partial perspective view of a pneumatic tire 10 relating to this embodiment. FIG. 2 is a partial front view of the pneumatic tire 10.

A plurality of circumferential grooves are provided on the pneumatic tire 10. In addition, the pneumatic tire 10 is provided with a plurality of rib-shaped land portions divided by the circumferential grooves and extending along the tire circumferential direction (direction D1 of FIG. 1). The pneumatic tire 10 is a tire manufactured taking into consideration of the reduction of tire noise such as air column resonance and is installed on passenger vehicles which require a high degree of quietness. Furthermore, the pneumatic tire 10 can be filled up with inert gas, such as nitrogen gas, instead of air.

More specifically, circumferential grooves 11, 12, 21, and 22 are provided on the pneumatic tire 10. The circumferential grooves 11, 12, 21, and 22 extend along the tire circumferential direction.

A rib-shaped land portion 110 is provided between the circumferential groove 11 and the circumferential groove 12. Namely, the rib-shaped land portion 110 is adjacent to the circumferential groove 11 and the circumferential groove 12 and extends along the tire circumferential direction.

A rib-shaped land portion 210 is provided between the circumferential groove 12 and the circumferential groove 21. A rib-shaped land portion 240 is provided between the circumferential groove 21 and the circumferential groove 22. The rib-shaped land portion 210 and the rib-shaped land portion 240 as well as the rib-shaped land portion 110 extend along the tire circumferential direction.

An air chamber 130A and an air chamber 130B (refer to FIG. 2) in which a recessed portion recessed toward the inside in the tire radial direction repeats along the tire circumferential direction at predetermined pitches are provided on the rib-shaped land portion 110.

A plurality of air chambers 220 (refer to FIG. 7 to FIG. 9) are provided on the rib-shaped land portion 210 along the tire circumferential direction. Similarly, a plurality of air chambers 250 (refer to FIG. 7) are provided on the rib-shaped land portion 240 along the tire circumferential direction.

(2) Shape of the Rib-Shaped Land Portion

Next, the shape of the rib-shaped land portion will be described. More specifically, the shape of the rib-shaped land portion 110 and the rib-shaped land portions 210 and 240 will be described.

(2. 1) Rib-Shaped Land Portion 110

Figure 3:
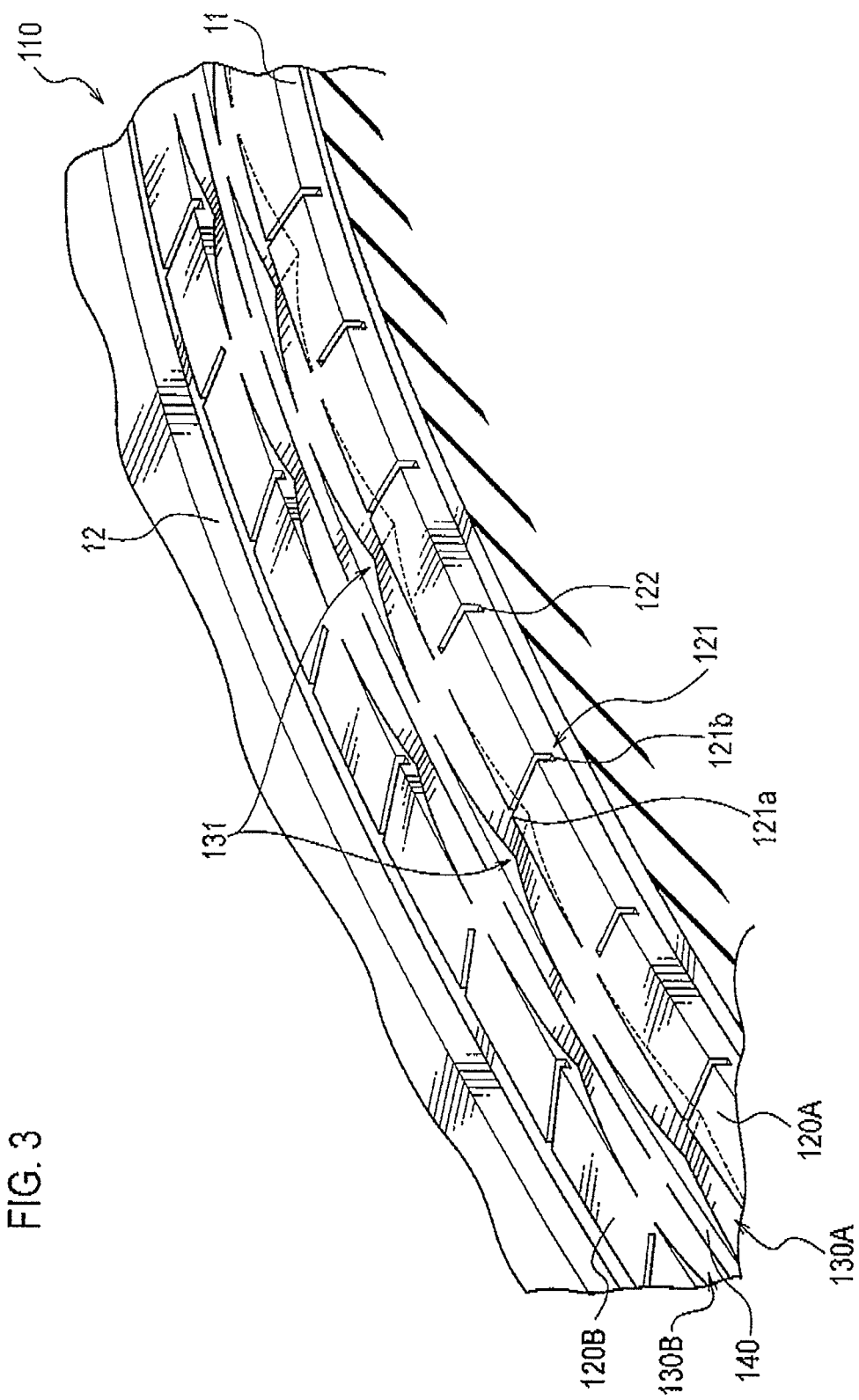
FIG. 3 is a partial perspective view of the rib-shaped land portion 110 according to the embodiment of the present invention.

FIG. 3 is a partial perspective view of the rib-shaped land portion 110. As shown in FIG. 3, the rib-shaped land portion 110 has a land portion 120A, a land portion 120B, and a land portion 140. The land portion 120A, the land portion 120B, and the land portion 140 are grounded with the road surface RS (not shown in FIG. 3, refer to FIG. 5), by means of the rolling motion of the pneumatic tire 10. In other words, the land portion 120A, the land portion 120B, and the land portion 140 configure a grounding surface of the pneumatic tire 10 grounding with the road surface RS.

The land portion 120A and the land portion 120B are provided on both ends in the tread width direction (direction D2 of FIG. 2) of the rib-shaped land portion 110. The land portion 120A is adjacent to the circumferential groove 11. The land portion 120B is adjacent to circumferential groove 12.

The air chamber 130A and the air chamber 130B are provided on the rib-shaped land portion 110. The air chamber 130A is provided between the land portion 120A and the land portion 140. The recessed portion 131 is formed recessed toward the inside in the tire radial direction in the air chamber 130A.

Figure 4:
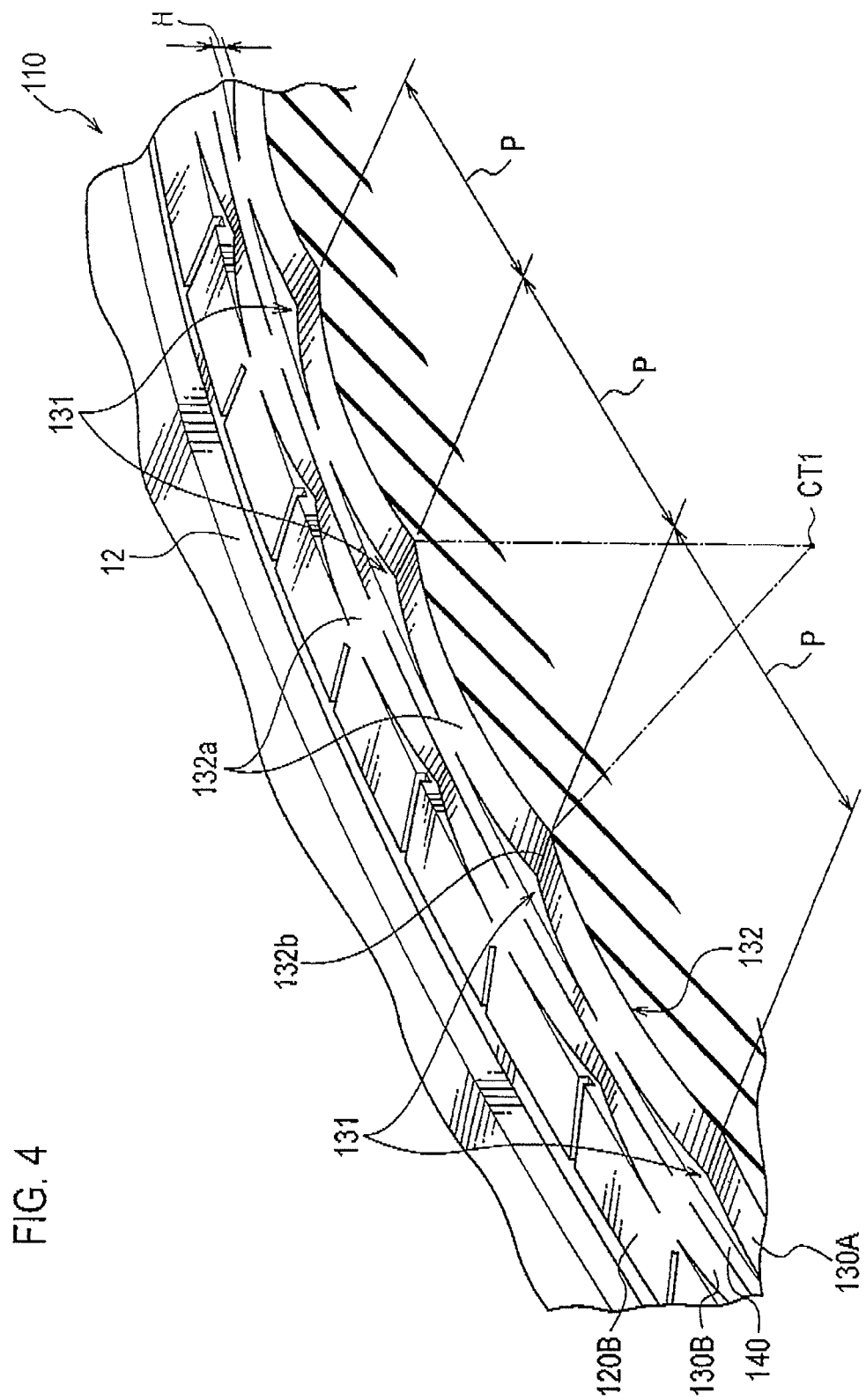
FIG. 4 is a partial perspective view of the rib-shaped land portion 110 with omitting the portion of the land portion 120A according to the embodiment of the present invention.

FIG. 4 is a partial perspective view of the rib-shaped land portion 110 with omitting the portion of the land portion 120A. As shown in FIG. 4, the recessed portion 131 is repeated at pitches of P (predetermined pitches) along the tire circumferential direction.

Although the air chamber 130A and the air chamber 130B are provided on the same rib-shaped land portion (rib-shaped land portion 110), the air chamber 130B is provided at a position different from the air chamber 130A in the tread width direction (direction D2). More specifically, the air chamber 130B is provided between the land portion 120B and the land portion 140. The shape of the air chamber 130B is identical to that of the air chamber 130A. Namely, for the air chamber 130A and the air chamber 130B, the recessed portion 131 is repeated at pitches of P. In the embodiment, the air chamber 130A configures the first air chamber and the air chamber 130B configures the second air chamber Since the shapes of the air chamber 130A and the air chamber 130B are identical, the shape of the air chamber 130A will be mainly described hereinafter. As shown in FIG. 4, the bottom surface 132 of the air chamber 130A is formed by repeating an arch shape forming a circular arc in the cross sectional view along the tire circumferential direction. In other words, the height H from the bottom surface 132 of the air chamber 130A up to the grounding surface (for example, the surface of the land portion 120A grounded to the road surface RS) changes along the tire circumferential direction. The center CT1 of the circular arc of the bottom surface 132 is positioned on the further inner side of the tire radial direction than the bottom surface 132.

The bottom surface 132 makes contact with the road surface RS at the highest position 132a where the height up to the grounding surface is highest. More specifically, the bottom surface 132 makes a line contact with the road surface RS along a direction different from the tire circumferential direction. In other words, the bottom surface 132 has a shape such that the width along the tire circumferential direction of the bottom surface 132 contact with the road surface RS becomes as narrow as possible.

Although the shape of the bottom surface of the air chamber 130B is identical to the shape of the bottom surface 132, there is a half phase shift of the pitch P in the tire circumferential direction between the highest position 132a of the bottom surface 132 of the air chamber 130A and the highest position 132a of the bottom surface of the air chamber 130B.

A constriction groove 121 and a narrow groove 122 are formed in the land portion 120A. The constriction groove 121 and the narrow groove 122 are narrow grooves whose groove widths are approximately several mm (millimeters). The constriction groove 121 communicates to the recessed portion 131. The volume of the space formed by the constriction groove 121 and road surface RS has a volume smaller than the space formed by the recessed portion 131 and the road surface.

Figure 5:
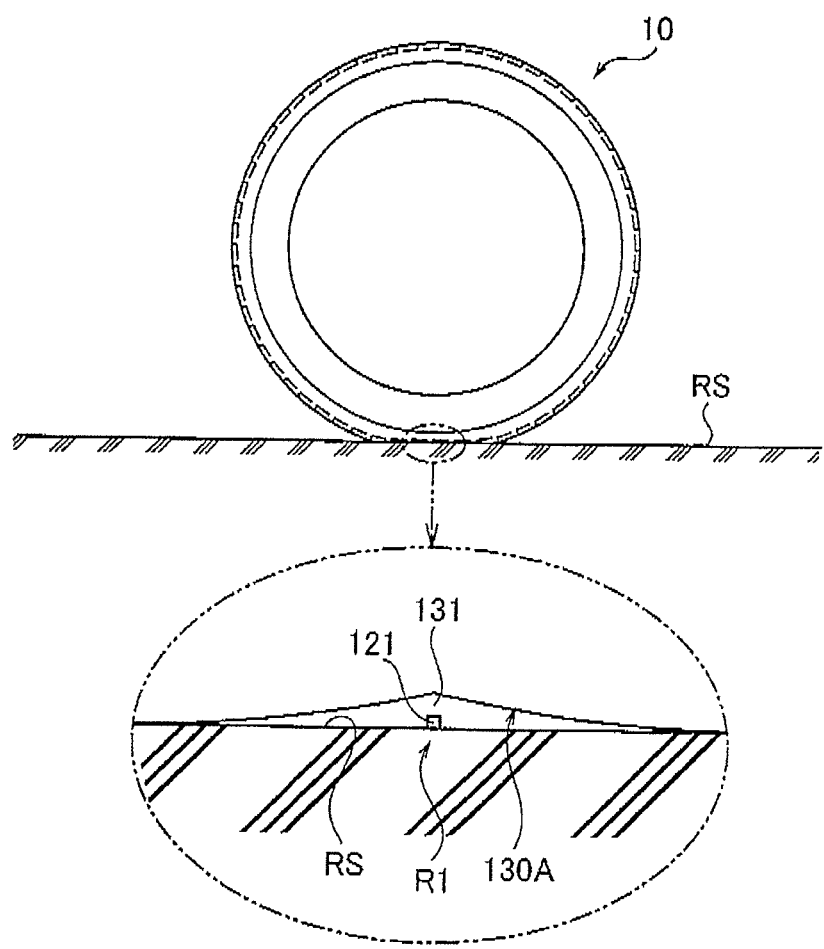
FIG. 5 shows the shape of a Helmholtz type resonator R1 as viewed in the tread width direction according to the embodiment of the present invention.
Figure 6:
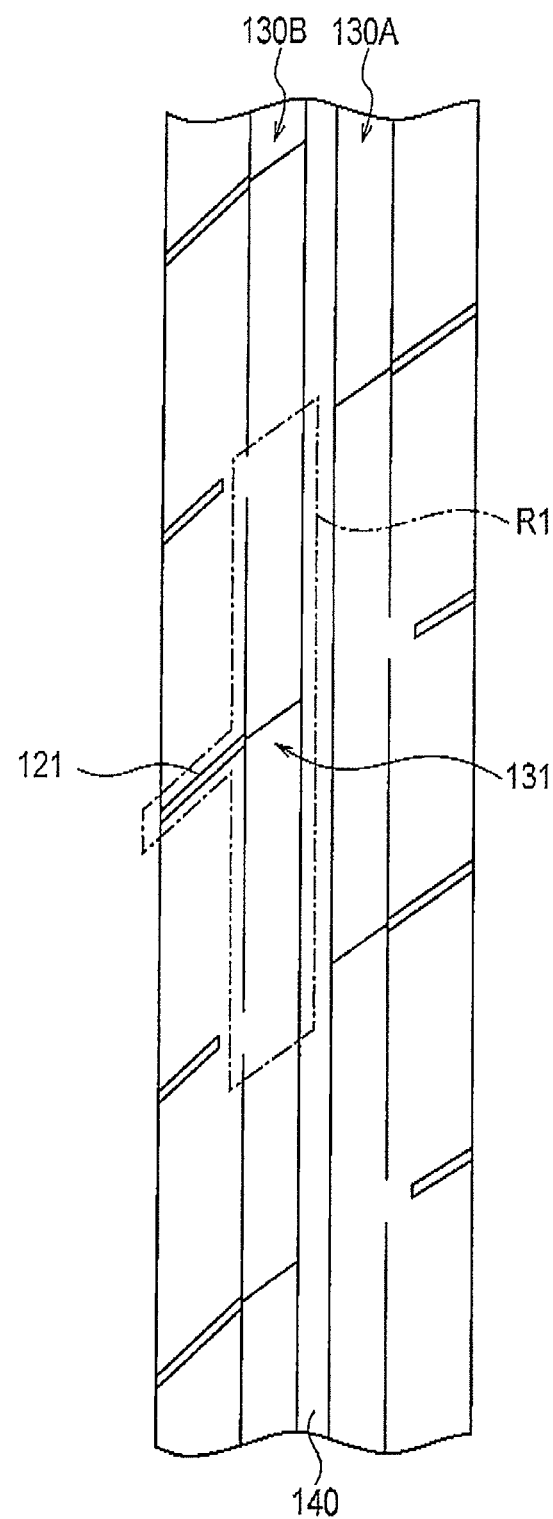
FIG. 6 shows the shape of a Helmholtz type resonator R1 viewed in a tread plane according to the embodiment of the present invention.

FIG. 5 and FIG. 6 show the shape of the Helmholtz type resonator R1 formed by the pneumatic tire 10 and road surface RS. More specifically, FIG. 5 shows the shape of the Helmholtz type resonator R1 as viewed in the tread width direction. FIG. 6 shows the shape of the Helmholtz type resonator R1 viewed in a tread plane. As shown in FIG. 5 and FIG. 6, the constriction groove 121 and the air chamber 130A that has the recessed portion 131 configure the Helmholtz type resonator R1.

As described above, although the height H from the bottom surface 132 of the air chamber 130A up to the grounding surface changes along the tire circumferential direction, a plurality of the highest positions 132a make contact with the road surface RS repeatedly at every pitch P. Because of this, an air chamber is formed to communicate to the constriction groove 121. Namely, an air chamber is formed for the Helmholtz type resonator R1 by means of the bottom surface 132 between the two highest positions 132a being adjacent to each other and the road surface RS making contact with the land portion 120A and the land portion 140. Because a method to reduce air column resonance using the Helmholtz type resonator R1 is disclosed in the prior art documents mentioned in this specification, the description will be omitted here.

As shown in FIG. 3, one end (end portion 121a) of the constriction groove 121 communicates to a closed space formed by the air chamber 130A and the road surface RS. More specifically, the end portion 121a communicates to a closed space formed by the recessed portion 131, the highest positions 132a formed at both ends in the tire circumferential direction of the recessed portion 131, and the road surface RS.

On the other hand, the other end (end portion 121b) of the constriction groove 121 communicates to the circumferential grooves 11. In this embodiment, the end portion 121a communicates to the recessed portion 131 at the lowest position 132b where the position of the bottom surface 132 is lowest. For this reason, the Helmholtz type resonator R1 opens at one end only and closes at the other end.

The narrow groove 122 communicates to the circumferential groove 11 only. In other words, the narrow groove 122 is not communicated to the recessed portion 131. For this reason, the narrow groove 122 does not serve as a component of the Helmholtz type resonator R1.

(2. 2) Rib-Shaped Land Portions 210 and 240

Figure 7:
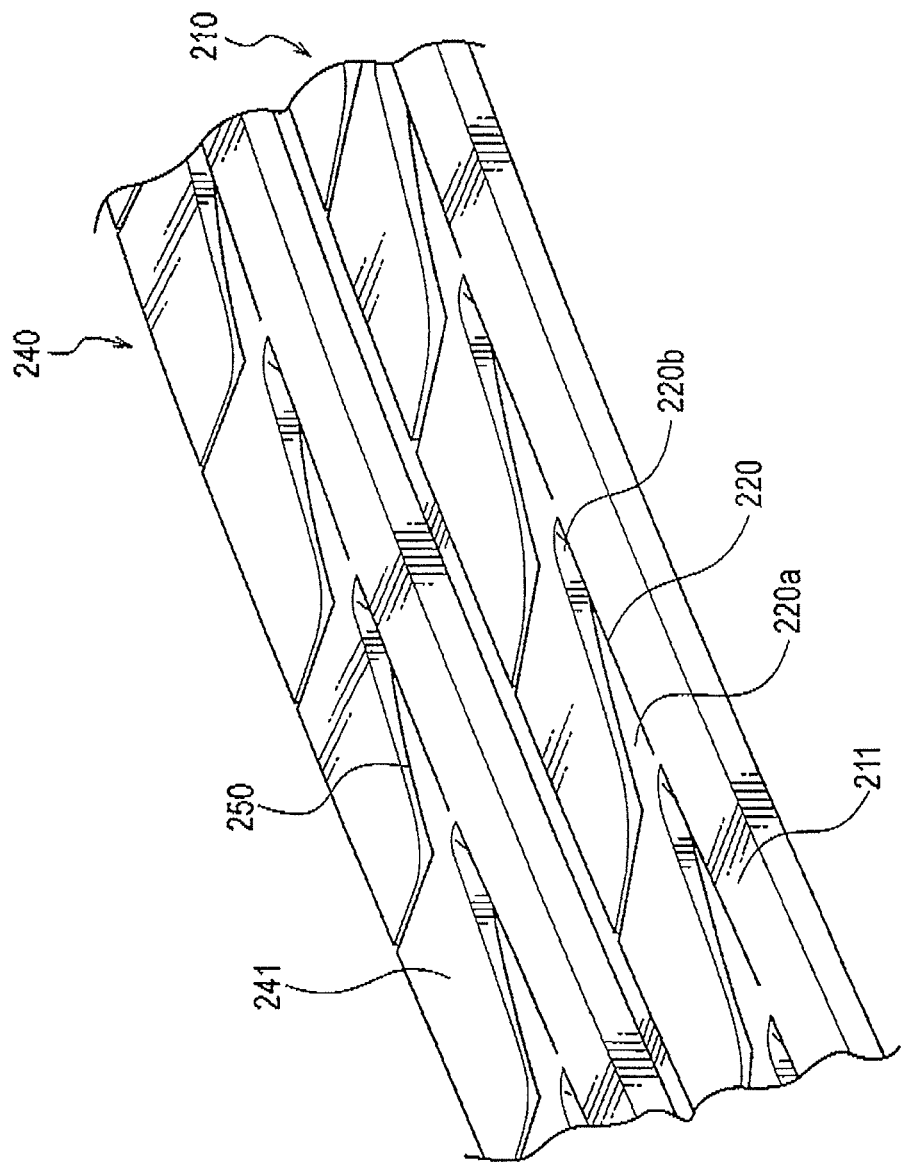
FIG. 7 is a partial perspective view of the rib-shaped land portion 210 and the rib-shaped land portion 240 according to the embodiment of the present invention.
Figure 8:
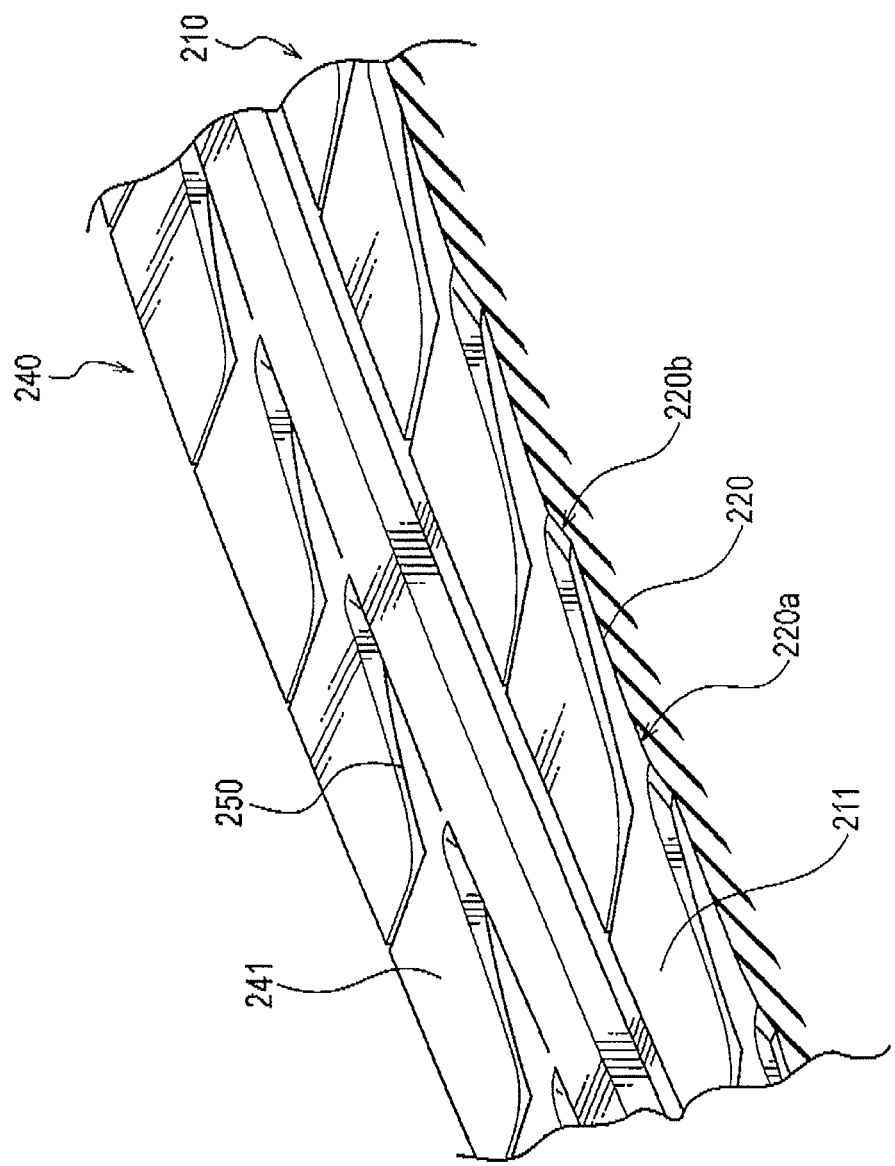
FIG. 8 is the partial perspective view of the rib-shaped land portion 210 and the rib-shaped land portion 240 with omitting a part of rib-shaped land portion 210 according to the embodiment of the present invention.

FIG. 7 is a partial perspective view of the rib-shaped land portion 210 and the rib-shaped land portion 240. FIG. 8 is a partial perspective view of the rib-shaped land portion 210 and the rib-shaped land portion 240 with omitting a part of the rib-shaped land portion 210. As shown in FIG. 7 and FIG. 8, the rib-shaped land portion 210 is provided with a land portion 211 grounded with the road surface RS (refer to FIG. 11) and a plurality of air chambers 220. The plurality of air chambers 220 are provided along the tire circumferential direction. The rib-shaped land portion 240 is provided with a land portion 241 which has an identical shape of the land portion 211 and an air chamber 250 which has an identical shape of the air chamber 220. The rib-shaped land portion 240 is arranged at the different position from the rib-shaped land portion 210 in the tread width direction. In the embodiment, the rib-shaped land portion 210 configures a first rib-shaped land portion and the rib-shaped land portion 240 configures a second rib-shaped land portion.

Figure 9:
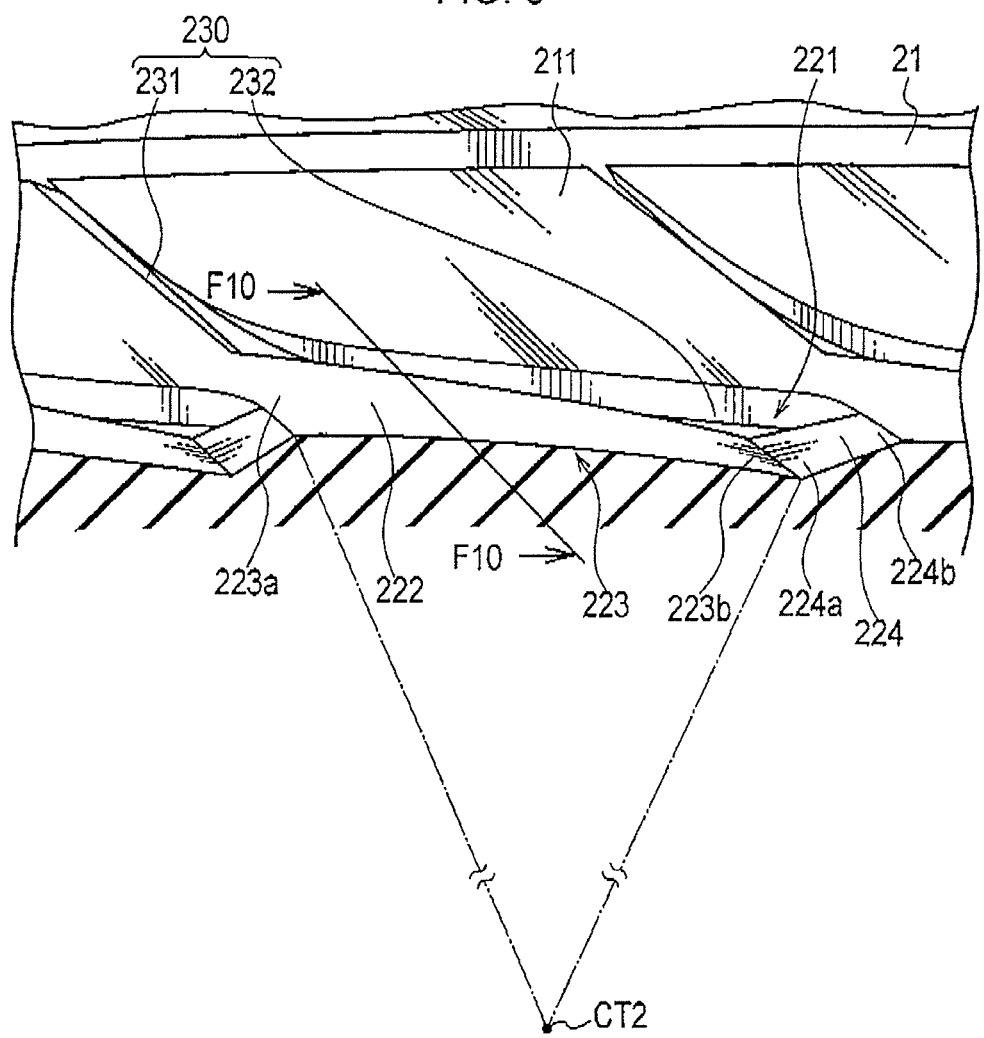
FIG. 9 is an enlarged perspective view of the air chamber 220 according to the embodiment of the present invention.
Figure 10:
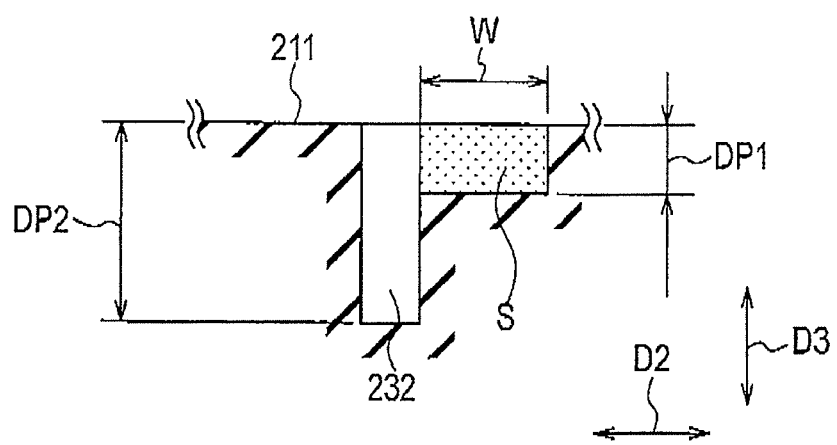
FIG. 10 is a cross-sectional view of the air chamber 220 along line F10-F10 shown in FIG. 9 according to the embodiment of the present invention.

Since the shapes of the air chambers 220 and the air chambers 250 are identical, in the following, a description of the shape of the air chamber 220 will be mainly described. FIG. 9 is an enlarged perspective view of the air chamber 220. FIG. 10 is the cross-sectional view of the air chamber 220 along line F10-F10 shown in FIG. 9. As shown in FIG. 9 and FIG. 10, the air chamber 220 has a recessed portion 221 recessed toward the inside in the tire radial direction.

The depth DP1 of the recessed portion 221 based on the grounding surface where the land portion 211 is grounded with the road surface (surface of the land portion 211 grounded to the road surface RS), is deeper at one end (the end portion 220*b* referred to FIG. 7 and FIG. 8) of the air chamber 220 in the tire circumferential direction than at the other end (the end portion 220*a* referred to FIG. 7 and FIG. 8) of the air chamber 220. The height from the bottom surface 222 of the recessed portion 221 up to the grounding surface changes along the tire circumferential direction.

The bottom surface 222 of the recessed portion 221 has a curved portion 223 in a curved line shape in the cross-sectional view along the tire circumferential direction. The center CT2 of the circular arc along the curved portion 223 is positioned on the further inner side in the tire radial direction than the bottom surface 222. The curved portion 223 can also be configured by a plurality of circular arcs. For this case, the center CT2 is taken as the center of one circular arc approximated to the curve formed by the plurality of circular arcs.

The bottom surface 222 has a linear portion 224 that has a linear shape in the cross sectional view along the tire circumferential direction. The linear portion 224 is formed on the end portion 220*b* (refer to FIG. 7 and FIG. 8) side of the air chamber 220. One end of the linear portion 224 (end portion 224*a*) connects to the end portion 223*b* of the curved portion 223 while the other end of the linear portion 224 (end portion 224*b*) connects to the grounding surface where the land portion 211 grounds with the road surface.

The constriction groove 230 communicates to the air chamber 220. More specifically, the constriction groove 230 communicates to the end portion 220*a* of the air chamber 220 in the tire circumferential direction. In other words, the constriction groove 230 communicates to a closed space formed by the air chamber 220 and the road surface RS. Moreover, the constriction groove 230 communicates to the circumferential groove 21. The volume of the space formed by the constriction groove 230 and a road surface is smaller than the volume of space formed by the recessed portion 221 and a road surface.

The constriction groove 230 is configured by an outer groove 231 and an inner groove 232. The outer groove 231 communicates to the circumferential groove 21, and extends to the end portion 220*a* of the air chamber 220. The inner groove 232 communicates to the outer groove 231, extends to the end portion 220*b* of the air chamber 220, and more specifically extends up to the side of the linear portion 224. In this embodiment, the inner groove 232 configures an extended portion. The inner groove 232 is formed between the recessed portion 221 and the grounding surface where the land portion 211 is grounded with the road surface.

As shown in FIG. 10, the constriction groove 230, more specifically, the depth DP2 of the inner groove 232 is deeper than the depth DP1 of the recessed portion 221 from the grounding surface where the land portion 211 is grounded with the road surface.

Figure 11:
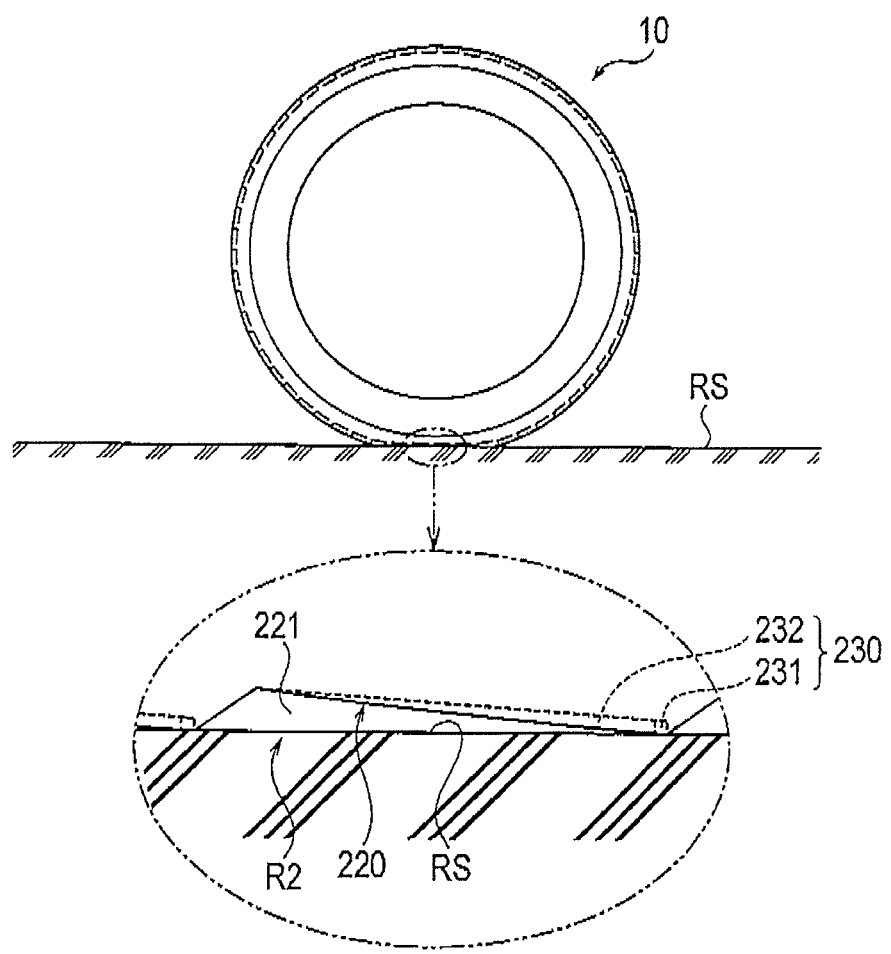
FIG. 11 shows the shape of a Helmholtz type resonator R2 viewed in the tread width direction of the tread according to an embodiment of the present invention.

FIG. 11 shows the shape of a Helmholtz type resonator R2 formed by the pneumatic tire 10 and the road surface RS. More specifically, FIG. 11 shows the shape of the Helmholtz type resonator R2 as viewed in the tread width direction. The region enclosed by the alternating long and short dashed lines of FIG. 12 shows the shape of the Helmholtz type resonator R2 as viewed in a tread plane.

As shown in FIG. 11, the constriction groove 230 configured by the air chamber 220 that has the recessed portion 221, the outer groove 231, and inner groove 232 configures the Helmholtz type resonator R2. In like manner to the Helmholtz type resonator R1, the Helmholtz type resonator R2 only opens at one end and closes at the other end.

Figure 12:
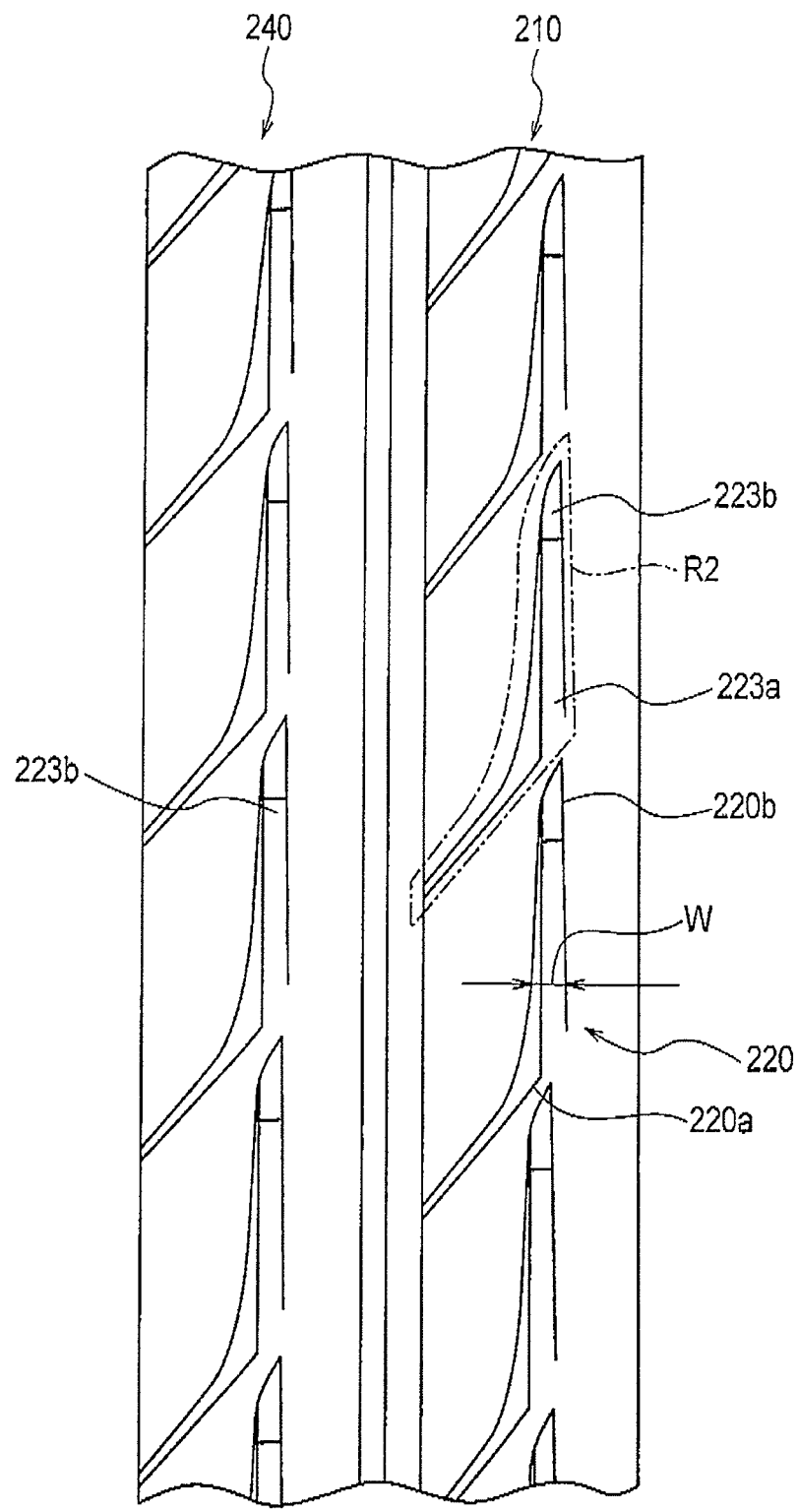
FIG. 12 is a partial enlarged plane view of a rib-shaped land portion 210 and a rib-shaped land portion 240 according to an embodiment of the present invention.

FIG. 12 is a partial enlarged plan view of the rib-shaped land portion 210 and the rib-shaped land portion 240. As shown in FIG. 12, the air chamber 220 has a tapered shape in which the width W in the tread width direction becomes narrower in proportion to movement from the end portion 220*a* of the air chamber 220 toward the end portion 220*b* as viewed in a tread plane.

The cross-sectional area S (refer to FIG. 10) along the tread width direction (direction D2) of the recessed portion 221 and the tire radial direction (direction D3 in the figure) is almost the same from one end (end portion 223*a*) in the tire circumferential direction of the curved portion 223 to the other end (end portion 223*b*).

In this embodiment, as shown in FIG. 12, the position in the tire circumferential direction of the air chamber 220 formed on the rib-shaped land portion 210 differs from the position of the air chamber 250 formed on the rib-shaped land portion 240. More specifically, the position (end portion 223*b*) with a deepest depth from the grounding surface (land portion 241) of the recessed portion formed on the rib-shaped land portion 240 is almost the same as the position with the shallowest depth (end portion 223*a*) from the grounding surface (land portion 211) of the recessed portion 221 formed on the rib-shaped land portion 210 in the tire circumferential direction.

(3) Operation and Effect

According to the pneumatic tire 10, the height H from the bottom surface 132 of the air chamber 130A (130B) up to grounding surface where the land portion 120A (120B) grounds with road surface RS changes along the tire circumferential direction. In other words, since the depth from the grounding surface of the air chamber 130A changes along the tire circumferential direction, wedged small stones will be moved in the tire circumferential direction along with the rolling motion of the pneumatic tire 10 even if a small stone becomes wedged by the air chamber 130A, making them easier to separate from the air chamber 130A. As a result, the occurrence of the so-called "wedged stone" can be inhibited.

By means of the constriction groove 121 and the air chamber 130A, or more specifically, since the Helmholtz type resonators R1 and R2 are configured to correspond to the frequency band of which sound will be absorbed, formed by the constriction groove 121 and an air chamber which is formed by contacting a plurality of the highest positions 132*a* with the road surface RS repeatedly at every pitch P, it possible to effectively reduce the air column resonance caused by the circumferential groove 11.

In this embodiment, the bottom surface 132 of the air chamber 130A makes a line contact with the road surface RS along a direction different from the tire circumferential direction. For this reason, the space of the air chamber 130A is easily enlarged thereby making it possible to easily configure a Helmholtz type resonator corresponding to the frequency band to be absorbed.

In this embodiment, the end portion 121a of the constriction groove 121 communicates to the recessed portion 131 at the lowest position 132b of the bottom surface 132. For this reason, even after the pneumatic tire 10 wears out a fixed amount, the function of a Helmholtz type resonator can be maintained.

In this embodiment, the bottom surface 132 of the air chamber 130A is formed by repeating an arch shape. The center of the circular arc that forms an arch shape is positioned on the further inner side of the tire radial direction than the bottom surface 132. For this reason, the function of the Helmholtz type resonator can be ensured while more effectively inhibiting the wedged stone.

In this embodiment, the highest position 132a of the bottom surface 132 of the air chamber 130A and the highest position 132a of the bottom surface of the air chamber 130B have a half phase shift of the pitch P in the tire circumferential direction. For this reason, the rigidity of the tread portions of the pneumatic tire 10 grounded to the road surface RS is almost uniform in the tire circumferential direction.

According to the pneumatic tire 10, the depth DP1 of the recessed portion 221 of the air chamber 220 is deeper than the end portion 220a of the air chamber 220 at the end portion 220b of the Air chamber 220. In addition, the bottom surface 222 of the recessed portion 221 has the curved portion 223. Namely, since small stones wedged in the air chamber 220 are supported in general at three points of the curved portion 223 and both side surfaces (land portion 211) of the recessed portion 221, it is easy to separate small stones from the air chamber 220 compared to when the bottom surface 222 is a flat surface. As a result, the occurrence of the "wedged stone" can be inhibited.

Furthermore, since the Helmholtz type resonator corresponding to the frequency band whose sound will be absorbed is configured by the constriction groove 230 and the air chamber 220, air column resonance caused by the circumferential groove 21 can be effectively reduced.

In this embodiment, the bottom surface 222 of the recessed portion 221 has the linear portion 224 communicating to the curved portion 223 and the grounding surface. For this reason, if a wedged small stone causes movement along with rolling motion of the pneumatic tire 10, the small stone is easy to separate from the air chamber 220 through the linear shape portion 224 communicating to the curved portion 223.

The constriction groove 230 communicates to the end portion 220a of the air chamber 220. The constriction groove 230 is also deeper than depth DP1 of the recessed portion 221 and has an inner groove 232 that extends to the end portion 220b of the air chamber 220. The inner groove 232 is formed between the recessed portion 221 and the land portion 211 (grounding surface). For this reason, even after the pneumatic tire 10 wears out a fixed amount, the function of a Helmholtz type resonator can be maintained.

In this embodiment, the cross-section area S is almost the same from the end portion 223a of the curved portion 223 to the end portion 223b. The deepest position (end portion 223b) from the grounding surface formed on the rib-shaped land portion 240 is almost the same as the shallowest position (end portion 223a) from the grounding surface of the recessed portion 221 formed on the rib-shaped land portion 210 in the tire circumferential direction. For this reason, the rigidity of the tread portion of the pneumatic tire 10 grounded to the road surface is almost uniform in the tire circumferential direction.

(4) Other Embodiments

As described previously, while the contents of the present invention are disclosed through the embodiments of the present invention, it should not be understood that the discussion and drawings which form a part of this disclosure limit the present invention. From this disclosure, a variety of alternative embodiments, examples, and operational techniques would become self-evident to one skilled in the art. For example, the embodiment of the present invention can be modified as follows.

FIGS. 13 (a) and (b) correspond to FIG. 3 and FIG. 4 of the embodiment described above, respectively. More specifically, FIGS. 13 (a) and (b) show air chambers relating to a modification of the present invention. As shown in FIGS. 13 (a) and (b), the bottom surfaces of air chambers 130C and 130D are in the shape of a sine wave in the cross sectional view along the tire circumferential direction. In like manner to the air chamber 130A and the air chamber 130B described above, the highest position 132a of the bottom surface of the air chamber 130C and the highest position 132a of the bottom surface of the air chamber 130B have an almost half phase shift of pitch Pin the tire circumferential direction.

When the shape of the bottom surface is a sine wave in this manner, the groove volume (negative ratio) of the tread portion of the pneumatic tire 10 grounded to the road surface is more uniform in the tire circumferential direction.

FIGS. 14 (a) and (b) show air chambers relating to another modification of the present invention. In the cross-sectional view along the tire circumferential direction, the bottom surface of air chambers 130B and 130F have a mountain shape (triangle). The arrangement relationship of the highest position 132a is the same as that of the embodiment described above.

FIGS. 15 (a) and (b) show air chambers relating to yet another modification of the present invention. The bottom surface of air chambers 130G and 130H is the same as that of the air chamber 130A and the air chamber 130B described above in having an arch shape that forms a circular arc in the cross-sectional view along the tire circumferential direction. However, the center of the circular are forming the bottom surface of an air chamber in the air chambers 130G and 130H is not in the tire radial direction inner side but in the tire radial direction outer side away from the bottom surface. In other words, the bottom surfaces of the air chambers 130G and 130H have an inverted arch shape as compared with those of the air chamber 130A and the air chamber 130B. The arrangement relationship of the highest positions 132a is the same as that of the embodiment described above.

Other than these types of modifications, the bottom surface of an air chamber can have a shape such as a staggered shape, a stair-like shape, and a combination of straight lines and circular arcs.

In the embodiment described above, the position in the tire circumferential direction of the air chamber 130A and the air chamber 130B and the positional relationship in the tire circumferential direction of the air chamber 220 and the air chamber 250, do not agree to have a uniform rigidity of the tread portion of the pneumatic tire 10 in a tire circumferential direction. Therefore, it is not always necessary to have such a positional relationship.

In the above-described embodiment, the constriction groove 230 includes the inner groove 232 that inks to the end portion 220a of the air chamber 220 and extends to the end portion 220b; however, the constriction groove 230 may not always include such a shape. For example, the constriction groove 230 may communicate to the center portion of the chamber 220. Likewise, the end portion 121a of the constriction groove 121 may not always communicate to the recessed portion 131 at the lowest position 132b of the bottom surface 132.

In the above-described embodiment, the narrow groove 121 is formed in the land portion 120A; however, the narrow groove 122 may not be formed. In the above-described embodiment, the air chamber 130A and the air chamber 130B are arranged in the same rib-shaped land portion; however, the both air chambers may be arranged in individual rib-shaped land portions respectively.

In the embodiment described above, although the circumferential grooves 11, 12, 21, and 22 are extended in a linear shape along the tire circumferential direction, as long as the circumferential grooves extend along the tire circumferential direction, there is no limitation on a linear shape and a staggered shape or a corrugated shape can also be used.

Thus, it is needless to say that various embodiments which not been disclosed here are also included in the present invention. Therefore, the technical scope of the present invention is only stipulated by the invention characteristics relating to the appropriate claims from above-mentioned description.

It is noted that the entire contents of Japanese Patent Application No. 2009-124615 (filed on May 22, 2009) are hereby incorporated in the present specification by reference.

Industrial Applicability

Thus, the tire according to the present invention, when including an air chamber that forms a constant space by making contact with the road surface and a Helmholtz type resonator including an air chamber and a constriction groove communicating to the circumferential groove, it can inhibit the wedging of small stones and effectively reduce the air column resonance. Therefore, the present invention is useful in the field of manufacturing a tire.

Reference Numeral

10 . . . pneumatic tire, 11,12,21,22 . . . circumferential grooves, 110 . . . rib-shaped land portion, 120A,120B . . . land portion, 121 . . . constriction groove, 121a,121b . . . end portion, 122 . . . narrow groove, 130A-130H . . . air chambers, 131 . . . recessed portion, 132 . . . bottom surface, 132a . . . highest portion, 132b . . . lowest portion, 140 . . . land portion, 210 . . . rib-shaped land portion, 211 . . . land portion, 220 . . . air chamber, 240 . . . rib-shaped land portion, 220a, 220b . . . end portions, 221 . . . recessed portion, 222 . . . bottom surface, 223 . . . curved portion, 224 . . . linear portion, 223a,223b,224a,224 . . . end portions, 230 . . . constriction groove, 231 . . . outer groove, 232 . . . inner groove, 241 . . . land portion, 250 . . . air chamber, CT1,CT2 . . . centers, DP1,DP2 . . . depths, H . . . height, P . . . pitch, R1,R2 . . . Helmholtz type resonators, RS . . . road surface, S . . . cross sectional area, W . . . width

The invention claimed is:

1. A tire comprising a rib-shaped land portion extending along a tire circumferential direction, which is adjacent to a circumferential groove extending along the tire circumferential direction, wherein
an air chamber having a recessed portion recessed toward an inside in the tire radial direction and a constriction groove communicating to the air chamber and the circumferential groove are provided on the rib-shaped land portion,
the recessed portion includes a portion having a depth where a grounding surface on which the rib-shaped land portion grounds a road surface as a reference is deeper at one end of the air chamber in the tire circumferential direction than at the other end of the air chamber,
a height from a bottom surface of the recessed portion to the grounding surface changes along the tire circumferential direction,
a volume of a space formed by the constriction groove and the road surface is smaller than a volume of a space formed by the recessed portion and the road surface,
the constriction groove includes;
an outer groove communicating to the circumferential groove, and extending to the other end,
an inner groove communicating to the outer groove, extending to the one end, and communicating to a closed spaced formed by the air chamber and the road surface,
the inner groove is formed between the recessed portion and a grounding surface where the rib-shaped land portion is grounded with the road surface, and
the inner groove includes a portion deeper than a depth of the recessed portion, in a cross sectional view of the tire along a tread width direction.

2. The tire according to claim 1, wherein
the bottom surface of the recessed portion comprises:
a curved portion having a curved line shape, in a cross-sectional view along the tire circumferential direction; and
a linear portion having a linear shape, in a cross-sectional view along the tire circumferential direction,
the center of a circular arc along the curved portion is positioned closer to an inside in the tire radial direction than the bottom surface,
the linear portion is formed at one end side of the air chamber, and
one end of the linear portion communicates to the curved portion, and the other end of the linear portion communicates to the grounding surface.

3. The tire according to claim 2, wherein the cross sectional area along a tread width direction and a tire radial direction of the recessed portion is approximately constant from one end to the other end in the tire circumferential direction of the curved portion.

4. The tire according to claim 1, wherein
the rib-shaped land portion comprises:
a first rib-shaped land portion in which a plurality of the air chambers are arranged along the tire circumferential direction; and
a second rib-shaped land portion in which a plurality of the air chambers are arranged along the tire circumferential direction and which is positioned at a position different from a position at which the first rib-shaped land portion is positioned in a tread width direction, and
a position, in the tire circumferential direction, of the air chamber formed in the first rib-shaped land portion differs from a position of the air chamber formed in the second rib-shaped land portion.

5. The tire according to claim 4, wherein
the position where the depth from the grounding surface of the recessed portion formed in the second rib-shaped land portion is deepest is approximately the same as the position where the depth from the grounding surface of the recessed portion formed in the first rib-shaped land portion is shallowest in the tire circumferential direction.

6. The tire according to claim 1, wherein the air chamber has a tapered shape in which the width in the tread width direction becomes narrower in proportion to movement from the other end of the air chamber toward one end thereof as viewed in a tread plane.

* * * * *